Dec. 18, 1956 E. L. WATHEN 2,774,163
DISPLAY DEVICE FOR USE WITH TIRES
Filed March 27, 1956
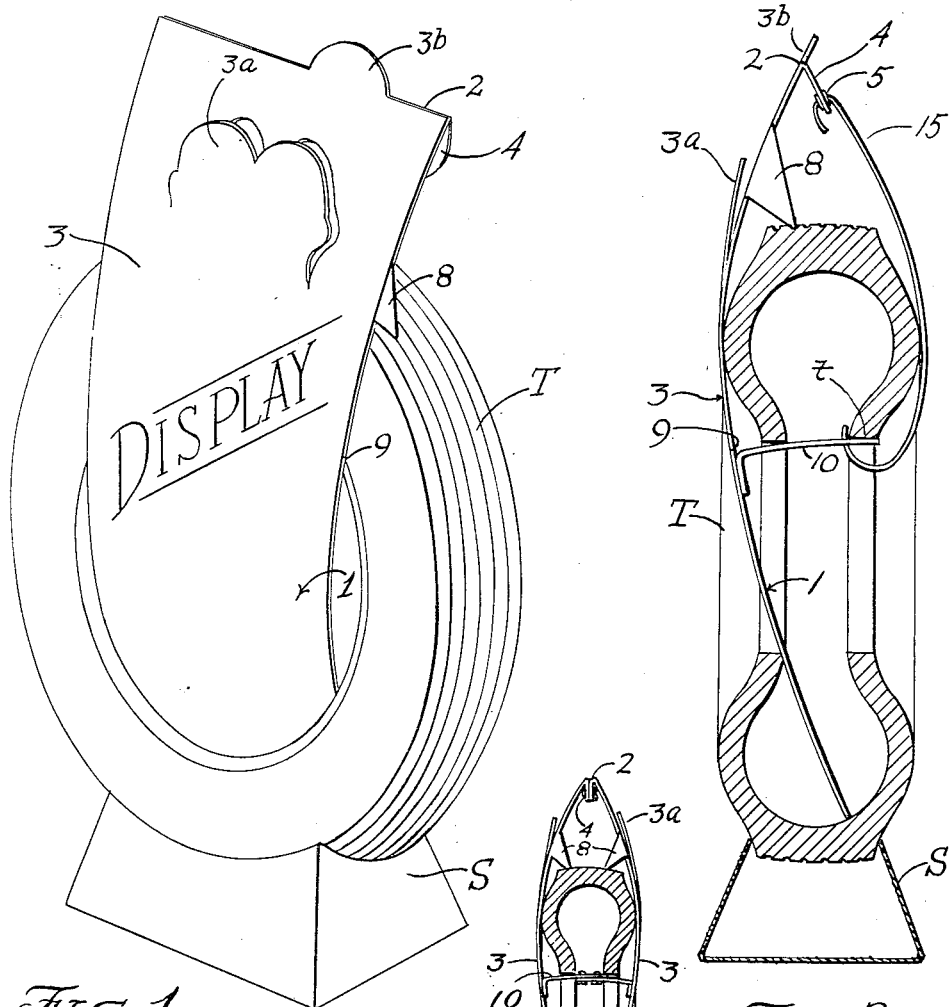
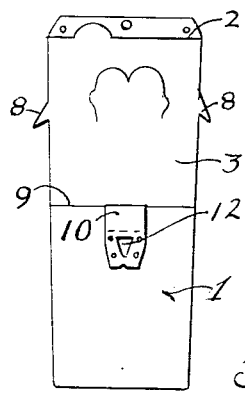
INVENTOR,
Ernest Leslie Wathen
BY
Brennan B. West
ATTORNEY.

United States Patent Office 2,774,163
Patented Dec. 18, 1956

2,774,163

DISPLAY DEVICE FOR USE WITH TIRES

Ernest Leslie Wathen, Rocky River, Ohio

Application March 27, 1956, Serial No. 574,275

14 Claims. (Cl. 40—125)

This invention relates to advertising displays, and more particularly to one for use with automobile tires.

Among the objects of the invention are to provide an advertising display device for use as aforesaid that is very attractive in appearance; that is of simple and substantial construction; that is inexpensive; that may be easily, quickly, and securely affixed to a tire in a forwardly bowed condition that enhances the appearance of the device; that, in its more comprehensive form, includes bracing means for better holding the device in the aforesaid condition and in place upon the tire, and that desirably includes parts within the display area that are partially cut from the body portion of the device so as to stand out in relief therefrom with a sort of three-dimensional effect when the display is applied to a tire in bowed condition, this feature incidentally providing one or more openings that cut down wind resistance when the display is used out of doors, thereby to minimize the likelihood of its being blown over.

Another object of the invention is to provide a display device of the kind above described that is capable of being folded over in a forward direction into relatively small compass for more convenient packing, storage and/or shipment, and a further object is to accomplish this end in such manner that the strength and appearance of the device are not impaired.

The foregoing objects and advantages, with others hereinafter appearing, are attained in the embodiment of the invention illustrated in the accompanying drawing wherein like parts are designated by like reference characters throughout the several views; and while I shall proceed to describe this embodiment in detail, I wish it to be understood that the same is to be taken as illustrative rather than as limiting, and that the invention is susceptible to such changes and modifications as fall within the scope of the claims appended hereto.

In the drawing,

Fig. 1 is a perspective view of a tire having my improved display device attached thereto;

Fig. 2 is a central vertical section through the tire along the axis thereof and showing the display device in side elevation;

Fig. 3 is a rear elevational view of the device in unfolded, flat condition and on a considerably reduced scale, and Fig. 4 is a view similar to Fig. 2, but much smaller, showing two of the display devices applied to a tire for use under circumstances in which the display is arranged for viewing from both sides.

The display device consists of a vertically elongated piece of sheet material, designated generally by the reference numeral 1. Said piece 1 may consist of cardboard of appropriate thickness and stiffness, and it is provided adjacent its upper end with a transverse bending line 2, such as one defined by a crease score. The part below said line constitutes the body portion 3 of the display device, while the part above said line forms a tab 4. The tab 4 includes an attaching means 5, shown as an aperture that is desirably fitted with an eyelet.

Although the body portion 3 may be of any suitable outline, it is disclosed herein as having downwardly converging lateral edges whereby its lower end is reduced to a width that adapts it well for insertion into the bottom portion of an automobile tire T. The tire is shown as supported in a vertical position within a conventional stand S. The upper region of the body portion 3 of the device is made as wide as practical so as to better adapt it to display purposes, and in the present case, parts 3ᵃ and 3ᵇ are partially severed from the piece of material for a double purpose hereinafter to be explained.

Shown integral with the body portion, and as extending from the lateral edges thereof near its upper end, are braces 8; and midway between the ends of the device, the body portion is shown as provided with a transverse cut score 9 on its rear side, enabling the device to be folded forwardly.

10 denotes a tongue that may be made of cardboard or the like, and it is transversely scored near one end to provide a base 11 that is fastened, as by an adhesive, to the rear side of the body portion immediately below the score 9. The tongue is shown as having an aperture 12 adjacent its distal end.

In attaching the device to a tire, as illustrated in Figs. 1 and 2, it is placed in front of the tire with its relatively narrow lower end engaged within the bottom portion of the latter. The upper end of the device is then drawn rearwardly so as to bow the body portion forwardly from to to bottom, and the tab 4 is turned over toward the back. To hold the device in this bowed condition, according to the method illustrated in Fig. 2, the upper hooked end of a resilient anchorage element 15 is engeged with the attaching means 5 of the tab 4, and its lower and larger hooked end is passed through the aperture 12 of the tongue 10 and is caught under the adjacent rear bead of the tire. The device is thus held in bowed condition under stress and quite firmly to the tire; and this effect is enhanced by wedging the braces 8 between the body portion 3 of the device and the top of the tire.

When the device is being placed in the condition above described, the part 3ᵃ will withdraw from the plane of the body portion, and inasmuch as the part 3ᵇ extends above and interrupts the bending line 2, it will project above the body portion when the tab 4 is turned rearwardly and downwardly, thus to make the display more interesting and conspicuous. Besides rendering the display more attractive in these particulars, and giving the area thereof about the part 3ᵃ a sort of three-dimensional effect, openings are provided through which air may pass so as to cut down wind resistance and thus render the display more stable when subjected to wind, as when used out of doors.

When the display is placed in a position where it may be observed to advantage as an advertising medium from both sides, two of the displays may be used back to back on the opposite sides of a tire, in the manner illustrated in Fig. 4, in which case the tabs 4 of the two displays may be secured together by suitable fastening means, and the tongues 10 overlapped beneath the top portion of the tire and fastened together. The tab 4 and tongue 10 are shown in Fig. 3 as having perforations for the accommodation of fastening means.

Having thus described my invention, what I claim is:

1. A display device for use with tires, the same comprising a vertically elongated piece of sheet material of suitable thickness and stiffness, the lower end of said piece being adapted to be disposed within the space inside the bottom portion of an upstanding tire while the upper end of said piece is located forwardly of the top portion of the tire, the upper end of the piece being provided with an attaching means, and an anchorage element adapted to be connected to said attaching means and to extend downwardly about the rear side of the top portion of the tire and to be attached to a part fixed with respect to the tire, said anchorage element having an effective length between its points of attachment such as will cause the piece to be held under stress in forwardly bowed condition about the top portion of the tire.

2. A display device according to claim 1, wherein parts are partially severed from the piece of material and withdraw forwardly from the plane thereof when the piece is bowed as described.

3. In a display device, the combination and arrangement of parts set forth in claim 1, and, in addition thereto, a tongue attached to the reverse side of said piece of material and adapted to be extended rearwardly below and adjacent to the top portion of the tire and connected to the anchorage element.

4. In a display device, the combination and arrangement of parts set forth in claim 1, wherein said piece of material is provided with a transverse score substantially midway between its ends whereby the piece may be folded forwardly, and tie means attached to the reverse side of said piece of material closely adjacent said score and adapted to be extended rearwardly below and in proximity to the top portion of the tire and attached to a part fixed with respect to the tire.

5. In a display device, the combination and arrangement of parts set forth in claim 1, and, in addition thereto, a tongue attached to the reverse side of the piece of material and adapted to be extended rearwardly below and adjacent to the top portion of the tire, the tongue having an aperture upwardly through which the hooked lower end of the anchorage element is adapted to be extended.

6. A display device according to claim 1, wherein the lateral edges of the piece of material are downwardly convergent so that the lower part of the device is relatively narrow for insertion into the tire and the top area of said piece is relatively wide so as to better adapt it to display purposes.

7. In a display device, the combination and arrangement of parts set forth in claim 1, and, in addition thereto, braces on said piece of material in proximity to the upper end thereof and adjacent its lateral edges and which are adapted to be placed under compression between said piece and adjacent parts of the tire.

8. A display device for use with tires, the same comprising a vertically elongated piece of sheet material of suitable thickness and stiffness, the lower end of said piece being adapted to be disposed within the space inside the bottom portion of an upstanding tire while the upper end of said piece is located forwardly of the top portion of the tire, a tab connected to the top of said piece and adapted to extend downwardly and rearwardly therefrom, said tab being provided with an attaching means, and an anchorage element adapted to be connected to said attaching means and to extend downwardly about the rear side of the top portion of the tire and to be attached to a part fixed with respect to the tire, said anchorage element having an effective length between its points of attachment such as will cause the piece to be held under stress in forwardly bowed condition about the top portion of the tire.

9. A display device for use with tires, the same comprising a vertically elongated piece of sheet material of suitable thickness and stiffness, the lower end of said piece of material being adapted to be disposed within the space inside the bottom portion of an upstanding tire while the upper end of said piece is located forwardly of the top portion of the tire, a tab connected to the top of said body portion and adapted to extend downwardly and rearwardly therefrom, said tab being porvided with an attaching means, and an anchorage element consisting of a piece of resilient wire formed at its upper end for holding engagement with said attaching means of the tab, said element being adapted to be drawn down rearwardly of the top portion of the tire and holdingly engaged within said top portion with the element under tension and said piece in forwardly bowed condition and under stress about the front side of the top portion of the tire.

10. A display device for use with tires, the same consisting of a vertically elongated piece of flexible sheet material of suitable thickness and stiffness having a transverse bending line adjacent its upper end, the portion above said line forming a tab that is adapted to be extended downwardly and rearwardly, and the part below said line constituting the body portion of the device, the lower end of the body portion being adapted to be inserted into the bottom portion of an upstanding tire so that the body portion may be bowed forwardly about the front side of the top portion of the tire, and means connected to said tab and extended downwardly about the rear side of the top portion of the tire and anchored beneath said portion so as to retain the body portion in forwardly bowed condition and under stress.

11. In a display device, the combination and arrangement of parts set forth in claim 10, and, in addition thereto, bracing means integral with the body portion at the lateral edges thereof and near the upper end of the body portion and which are adapted to be extended rearwardly and compressed between the body portion and the top portion of the tire.

12. A display device for use with tires, the same consisting of a vertically elongated piece of sheet material of suitable thickness and stiffness, and provided with a transverse bending line adjacent its upper end to set off therebelow the body portion of the device and above said line a tab that is adapted to be extended downwardly and rearwardly from the upper end of the body portion, said tab having an aperture, and an anchorage element consisting of a piece of resilient wire provided with a relatively small hook at its upper end for engagement within the aperture of the tab and a relatively large forwardly directed hook at its lower end for engagement within the upper portion of the tire, said body portion being adapted to have its lower end placed within the bottom of an upstanding tire and to be bowed forwardly about the front side of the top portion of the tire when said anchorage means is drawn down about the rear side of the upper portion of the tire and engaged within the tire as aforesaid.

13. A display device for use with tires, the same comprising two units each consisting of a vertically elongated piece of flexible sheet material of suitable thickness and stiffness, said units being adapted to be disposed on the opposite sides of the top portion of an upstanding tire and to have their lower ends engaged within the space enclosed by the bottom portion of the tire, means connecting together the upper ends of the two units, and tie means joined to the reverse sides of the two units immediately below the top portion of the tire for holding the units against undue separation in the zone of said tie means.

14. A display device for use with tires, the same comprising two units each consisting of a vertically elongated piece of flexible sheet material of suitable thickness and stiffness, said units being adapted to be disposed on the opposite sides of the top portion of an upstanding tire and to have their lower ends engaged within the space enclosed by the bottom portion of the tire, means connecting together the upper ends of the two units, a tongue joined to the reverse side of each unit and so located that it is immediately below the top portion of the tire when the unit is applied to the tire in the foregoing manner, the tongues of the two units being adapted to overlap each other, and fastening means for connecting the tongues thereby to hold the units against undue separation within the zone of said tongues.

No references cited.